US005673684A

United States Patent [19]
Myles, III et al.

[11] Patent Number: 5,673,684
[45] Date of Patent: Oct. 7, 1997

[54] TRACKING SOLAR ENERGY CONCENTRATING SYSTEM HAVING A CIRCULAR PRIMARY REFLECTOR AND A TRACKING SECONDARY COMPOUND PARABOLIC REFLECTOR

[76] Inventors: John F. Myles, III, Rte. 3 Box 200, Pittsboro, N.C. 27312; Michael H. Nicklas, 1237 Gatehouse Dr., Cary, N.C. 27511; Louis J. Gerics, 804 Sasser St., Raleigh, N.C. 27604

[21] Appl. No.: 592,055

[22] Filed: Jan. 26, 1996

[51] Int. Cl.⁶ .................................................. F24J 2/12
[52] U.S. Cl. ........................ 126/694; 126/692; 126/696; 126/600
[58] Field of Search ........................ 126/600, 601, 126/605, 696, 684, 692, 694, 685, 693

[56] References Cited

U.S. PATENT DOCUMENTS

| | | |
|---|---|---|
| 3,868,823 | 3/1975 | Russe, Jr. et al. . |
| 4,149,817 | 4/1979 | Miller et al. ............ 126/684 |
| 4,230,095 | 10/1980 | Winston . |
| 4,359,265 | 11/1982 | Winston . |
| 4,387,961 | 6/1983 | Winston . |
| 4,602,613 | 7/1986 | Barr . |
| 5,274,497 | 12/1993 | Casey . |
| 5,289,356 | 2/1994 | Winston . |

*Primary Examiner*—Carl D. Price
*Attorney, Agent, or Firm*—Brian D. Voyce

[57] ABSTRACT

The present invention relates to an improved solar energy concentrating system and to a preferred novel focal collection zone for such a system. In general, the system comprises a moveable solar energy collector supported above a cylindrically arcuate solar energy concentrating reflector. The solar energy collector has a compound parabolic non-imaging shape. In a preferred embodiment, instead of positioning the collector to rotate about the center of curvature of the reflector and to extend down halfway between the center of curvature and the reflector, in the present invention, the solar energy collector extends further down according to a particular algorithm.

4 Claims, 4 Drawing Sheets

TRACKING SOLAR ENERGY CONCENTRATING SYSTEM HAVING A CIRCULAR PRIMARY REFLECTOR AND A TRACKING SECONDARY COMPOUND PARABOLIC REFLECTOR

TECHNICAL FIELD

The present invention relates to an improved solar energy concentrating system and to a preferred novel focal collection zone for such a system. In general, the system comprises a moveable linear solar energy collector supported above a cylindrically arcuate solar energy concentrating reflector. The solar energy collector has a compound parabolic cross section, preferably based on non-imaging optics. In a preferred embodiment, instead of positioning the collector to rotate about the center of curvature of the reflector and to extend down halfway between the center of curvature and the reflector, in the present invention, the solar energy collector extends further down according to a particular algorithm.

RELATED APPLICATIONS

The present invention can be made in a modular form as described in Ser. No. 379,841 entitled "A Roof Having an Integral Solar Energy Concentrating System", filed on Jan. 26, 1995, and incorporated by reference hereto.

The present invention also can incorporate the use of replaceable solar energy concentrating reflectors as described in Ser. No. 379,844, entitled "An Improved Solar Energy Concentrating System Having Replaceable Reflectors", filed on Jan. 26, 1995, and incorporated by reference hereto.

The present invention also can incorporate the use of an automatic safety means for the secondary collector as described in Ser. No. 379,845, entitled "An Improved Solar Energy Concentrating System Having An Automatic Safety Means", filed on Jan. 26, 1995, and incorporated by reference hereto.

BACKGROUND ART

In the past, solar energy concentrating systems have used a variety of approaches for achieving a maximum collection of solar energy from a combination of a cylindrically arcuate primary concentrating reflector and a movable secondary solar energy collector. For example, U.S. Pat. No. 4,602,613 to Bart, discloses a combination of a stationary cylindrically arcuate primary collector and a moveable secondary collector. However, the secondary collector is a flat plate collector that moves in a horizontal direction.

In another traditional configuration, described in U.S. Pat. No. 3,868,823, a simple conduit is used as a secondary solar energy collector in combination with a circular primary collector formed from a plurality of longitudinal slats arranged in a circular arcuate fashion. The conduit is pivoted about the center of curvature for the primary reflector. The conduit is placed on a rotating member that extend up from the center of curvature. The length of that member extends anywhere from one to one half the radius of curvature of the reflector.

Compound parabolic optics have been used to collect solar energy. The seminal work of Dr. Roland Winston embodies this work, as seen in U.S. Pat. No. 4,230,095; U.S. Pat. No. 4,359,265; U.S. Pat. No. 4,387,961; and U.S. Pat. No. 5,289,356. (For the purposes of the present invention, the phrases "compound parabolic" and "non-imaging optics" include the definitions set forth in Dr. Winston's work.) However, in all of these disclosures, a compound parabolic optically based concentrator has always been used alone as a primary solar energy concentrator, never in tandem as a secondary solar energy concentrator paired with a primary reflector.

DISCLOSURE OF THE INVENTION

The present invention relates to an improved solar energy concentrating system with a greater solar collection efficiency. All the elements of the present invention may have been used in the prior art. The novelty of the present improvement lies in the unexpected benefits in changing the relationship among the elements, in particular, pairing a compound parabolic solar collector as a secondary solar energy collector in tandem with a cylindrically arcuate solar energy concentrating reflector as a primary collector.

In the present invention, a solar energy primary concentrating reflector has a concave and cylindrically arcuate configuration of up to about 220 degrees, a first end edge, an second end edge and curved lateral end edges. The primary concentrating reflector has a curvature from the first end edge to the second end edge that is circular. The curvature defines an arc length for the reflective surface that is up to about 220 degrees. The reflective surface is on the concave surface formed by the curvature. A structural support means is disposed beneath the reflector. It is dimensioned and configured to support the weight of at least the primary concentrating reflector, a solar energy linear collector, and a collector support means. A collector support means spans across the reflector, from the second end edge to the first end edge. The collector support means is connected to solar energy secondary solar energy collector and either the reflector, the structural support means, or a supporting surface that underlies the structural support means. The collector support means is dimensioned and configured so to support a solar energy linear collector and allow it to move in a circular arc path so as to stay within a second focal collection zone above the primary concentrating reflector.

A linear solar energy secondary collector extends lengthwise across the reflector, from one curved lateral end edge to another curved lateral end edge. The linear collector has a secondary concentrating compound parabolic reflector which is meant to face the primary concentrating reflector. The collector is located by and disposed on the linear collector support means so as to move in the circular arc path within a predetermined second focal zone for collecting solar energy reflected from the reflector. The focal zone position can vary, depending upon the exact compound parabolic cross section used for the collector. Typically, the zone would be located at about one half the radius of the center of curvature for the primary reflector. The collector is dimensioned and configured to receive reflected solar energy into a conduit through which an energy transfer fluid can flow. The conduit is disposed within a first focal collection zone defined by the secondary compound parabolic reflector.

Also included in preferred embodiments of the present invention is a means for rotating and supporting the collector so as to position the linear collector along the circular arc path. Connected to the linear collector so as to position the linear collector along the circular arc path support means, the positioning means places the collector in an optimal position within the second focal collection zone for collecting solar energy throughout a defined solar cycle, such as the diurnal cycle.

The final element is a fluid transport means which connects the conduit to a thermal energy me means or an energy storage means. When the sun shines, solar energy bounces off the reflector towards the concentrator, where it is impinged upon the conduit. The fluid within the conduit of the collector is heated. The fluid transport means circulates the heated fluid through either the thermal energy use means or the energy storage means.

In a preferred embodiment using a non-imaging compound parabolic secondary collector, the present invention comprises the collector pivoting about the center of curvature of the reflector, while the collector is located down from the center of curvature by a distance L plus or minus 5% according to the formula: L=(R * 1.1)/2; where R equals the radius of the curvature of the solar energy concentrating reflector. By using such a position, one can achieve greater accumulation of reflected solar energy than at previous known locations, including the prior art mounting of the collector at the halfway position.

BEST MODES FOR CARRYING OUT THE INVENTION

Figure 1:
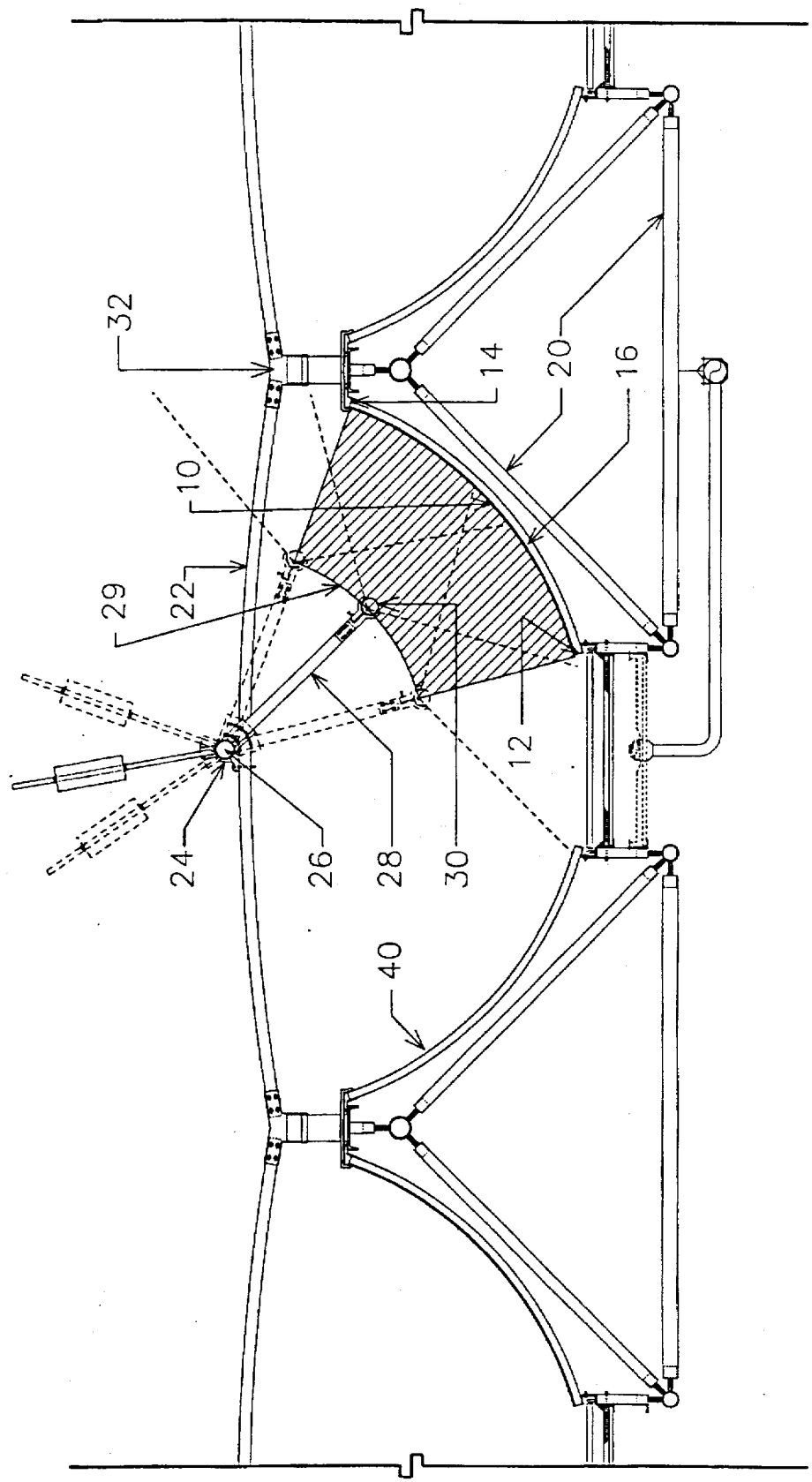
FIG. 1 is a sectional view of the present invention.
Figure 2:
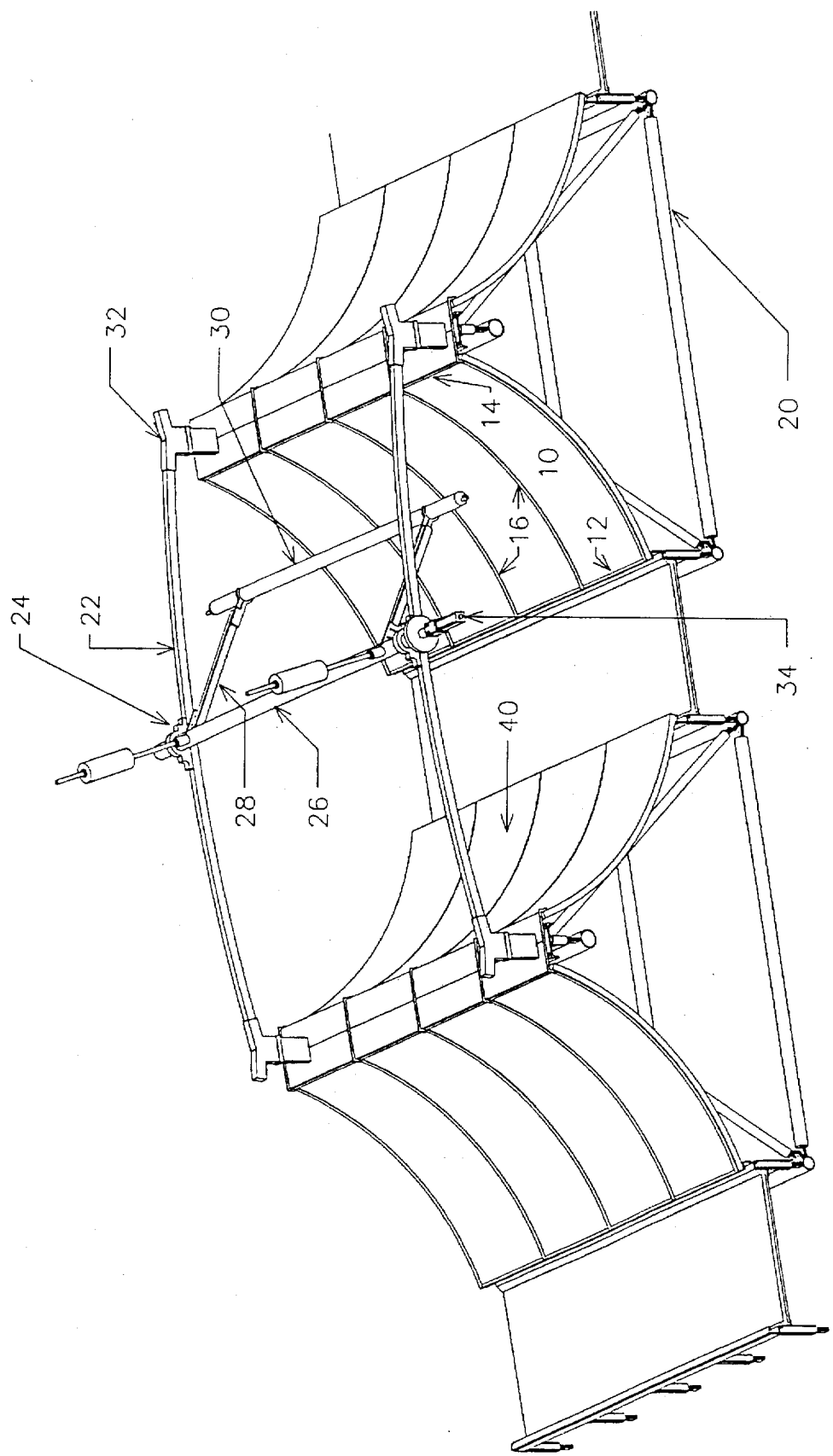
FIG. 2 is an isometric view of the present invention.

A preferred embodiment of the present invention is shown in FIG. 1. A solar energy concentrating primary reflector (10) having a concave and cylindrically arcuate configuration of about 60 degrees has a first end edge (12), an second end edge (14), and curved lateral end edges (16). Suitable materials for the primary concentrating reflector include polished metals or reflectorized materials having deposited or laminated coatings. In one preferred embodiment, the primary concentrating reflector comprises an ultraviolet-stabilized plastic or polymer having a reflectorized surface of aluminum deposited thereon. The skyward surface of the reflector is the concave surface. In another preferred embodiment, a first reflector can be adjacent to a second primary concentrating reflector, either along its curved lateral end edges or its first end edge. In the latter case, the lower edge of a first primary concentrating reflector is adjacent along the entire lower edge to the first edge of a second primary concentrating reflector, each reflector having a cylindrically arcuate configuration of up to about 90 degrees, the pair forming a cylindrically arcuate configuration of up to about 180 degrees.

A structural support means (20), such as a space truss, is disposed beneath the primary concentrating reflector. The structure support means is dimensioned and configured to support the weight of at least the primary concentrating reflector, a compound parabolic second solar energy collector, and a solar energy collector support means, as well as conventional live loads and dead loads. A number of alternative configurations can be designed by those of ordinary skill in the art. A collector support means spans lengthwise across and above the primary concentrating reflector, as defined by the axis extending from the second end edge (14) to the first end edge (12). The collector support means comprises two arches (22), a bearing means (24) disposed on each arch, a drive shaft member (26) connected to the bearing means (so as to comprise a rotating means), and two downward spacing members (28). The rotating means is located at the center of curvature for the primary concentrating reflector, as shown by the circular path (29) in FIG. 1. The downward spacing members are dimensioned such that the linear collector is located down from the center of curvature by a distance L plus or minus 5% according to the formula:

$$L=(R*1.1)/2;$$

where R equals the radius of the curvature of the primary concentrating reflector. The above arrangement of elements allows the secondary linear collector to move along a circular arc path within a predetermined and defined second focal zone for collecting solar energy reflected from the primary reflector.

The non-imaging solar energy collector (30) is connected to the structural support means (20) by the linear collector support means. Attachment points (32) are located adjacent to both the second end edges and the first end edges of the primary concentrating reflector, the attachment points also being connected to the arches (22). Alternatively, the collector support means could have been connected to a supporting surface that underlies the structural support means. The linear collector support means is dimensioned and configured so to support the linear collector and allow it to move along a circular arc path and thus, alternate designs are known to those of ordinary skill in the art.

In some preferred embodiments, the linear collector is oriented lengthwise within 30 degrees of a true East:West axis, such as in the embodiment shown in FIG. 1. However, if the non reflective panel (40) in FIG. 1 is replaced with a primary concentrating reflector, then one could orient the linear collector lengthwise within 30 degrees of a true North-South axis.

Preferably, a means for positioning the solar energy collector (34) is connected to the drive shaft member (26). The positioning means can comprise a number of conventional means including a hydraulic motor driven by a hydraulic pump and control means, an electrical step motor, or a mechanical chain/gear or cable/pulley means. In any of these forms, the positioning means keeps the collector in an optimal position for collecting solar energy throughout a defined solar cycle, preferably the diurnal cycle. Thus, a microprocessor can be part of the positioning means, calculating periodically the optimal solar energy gathering position according to an algorithm that takes into account the latitude, the time of year, and the time of day. Such algorithms are known to those of ordinary skill in the art.

Figure 3:
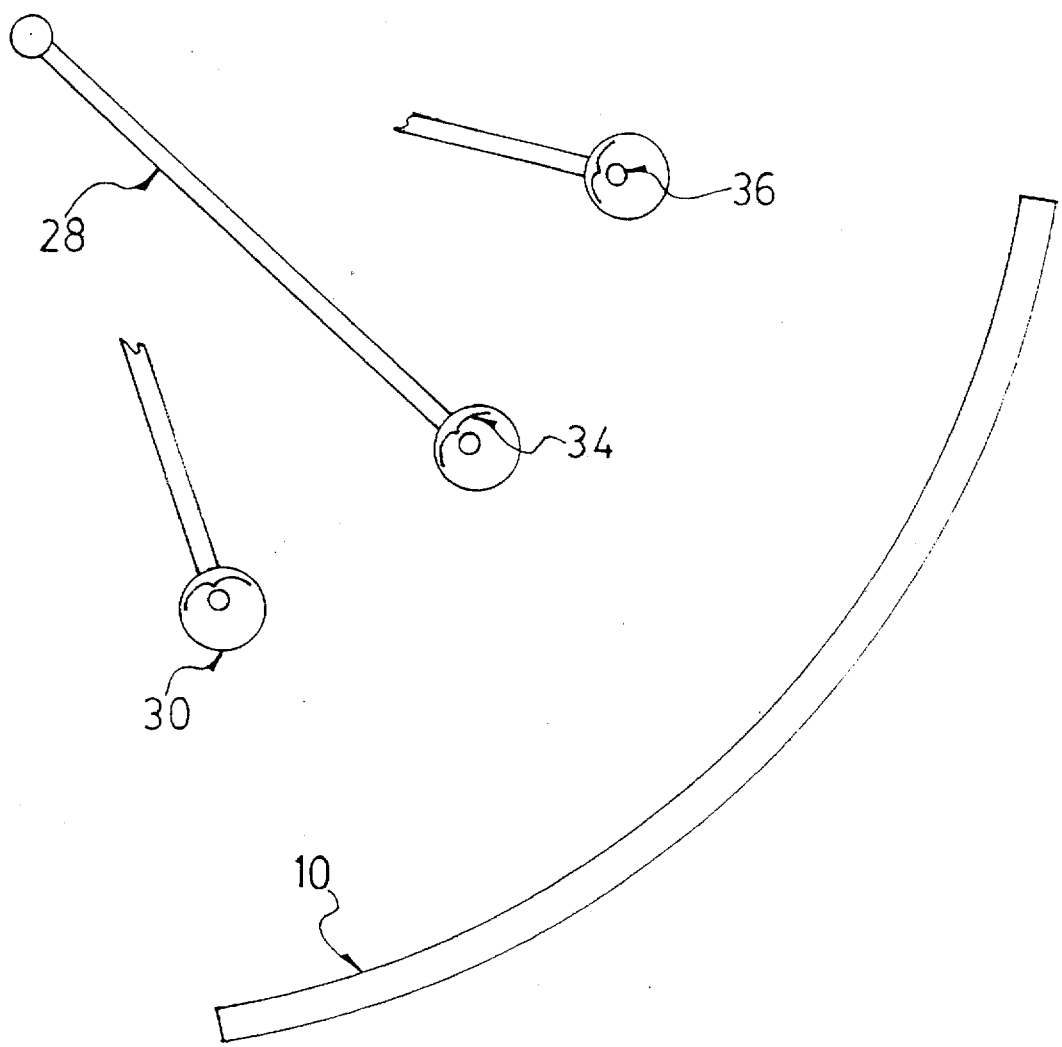
FIG. 3 is a detailed view showing the relationship between the primary concentrating reflector and the secondary compound parabolic reflector.
Figure 4:
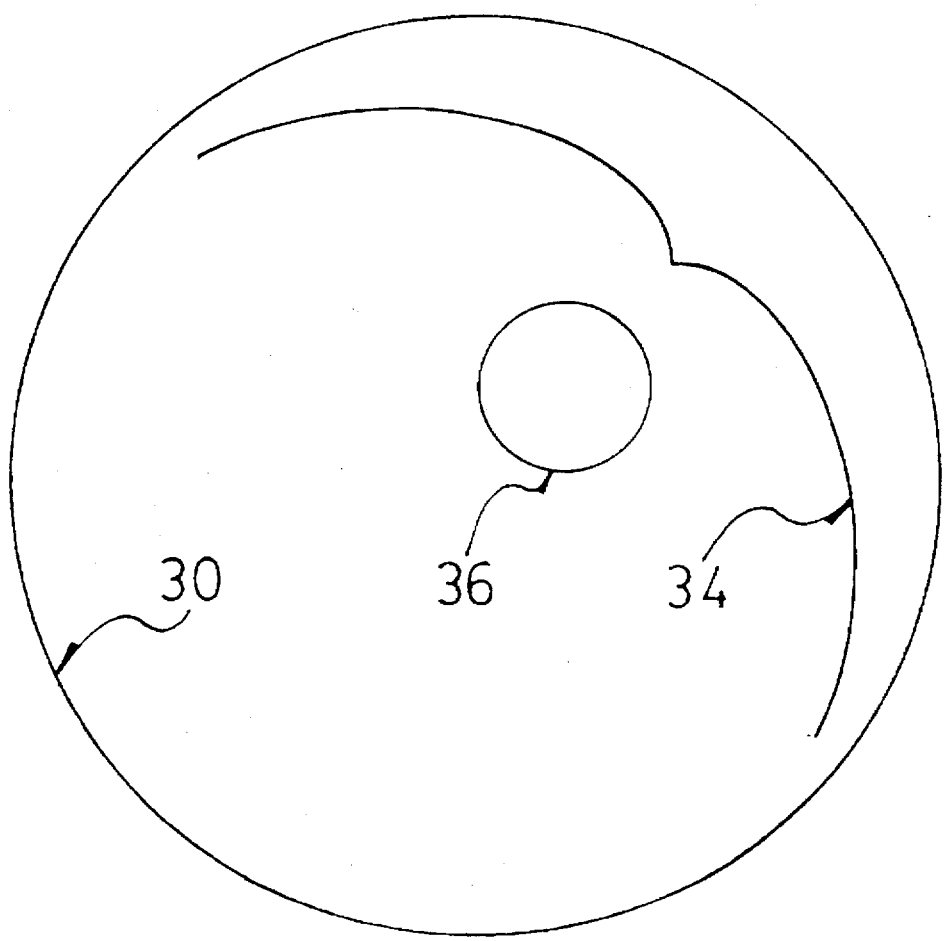
FIG. 4 is a detailed view showing the secondary compound parabolic reflector.

The linear collector is dimensioned and configured with a secondary compound parabolic reflectors (34) as shown in FIGS. 3 and 4, so as to receive reflected solar energy into an interior conduit through which an energy transfer fluid can flow. Preferred cross sectional embodiments linear collectors having for compound parabolic secondary linear collectors to be used with cylindrically arcuate primary concentrating reflectors are disclosed in U.S. Pat. No. 5,274,497 or U.S. Pat. No. 5,289,356. Suitable fluids for use in the collector conduit (36) include commercially available heat transfer fluids. A fluid transport system, not shown, connects the conduit of the linear reflectors to a thermal energy use means or a thermal energy storage means. The fluid transport means circulates the solar energy-heated fluid. The fluid transport means can be of conventional designs known to those of ordinary skill in the art.

All publications or unpublished patent applications mentioned herein are hereby incorporated by reference thereto.

Other embodiments of the present invention are not presented here which are obvious to those of ordinary skill in the art, now or during the term of any patent issuing from this patent specification, and thus, are within the spirit and scope of the present invention.

We claim:

1. A solar energy concentrating system having:
   a) at least one solar energy primary concentrating reflector having a reflective surface, a first end edge, a second end edge, and two curved lateral end edges, the primary concentrating reflector having a curvature from the first end edge to the second end edge that is circular, said curvature defining an arc length that is up to about 220 degrees, and the reflective surface of the primary concentrating reflector being disposed on a concave surface formed by the curvature;
   b) a means for providing structural support disposed beneath and attached to the primary concentrating reflector;
   c) a means for supporting a solar energy linear collector, the collector support means being connected to the linear collector and the structural support means, and the collector support means being dimensioned and configured so as to support the linear collector and to allow the linear collector to move in a circular arc path that is spaced apart from the reflective surface;
   d) the linear collector:
      i) having a secondary concentrating compound parabolic reflector;
      ii) having a conduit through which an energy transfer fluid flows, the conduit being disposed within a first focal collection zone defined by the compound parabolic reflector, the energy transfer fluid being heated by the reflected solar energy received from the secondary compound parabolic reflector;
      iii) having a length longitudinally across the reflector from the first curved lateral end edge to the second curved lateral end edge;
      iv) being disposed so as to have the secondary compound parabolic reflector face the primary concentrating reflector and to be moved along the circular arc path by the collector support means, the circular arc path being located within a second focal collection zone whereby the secondary compound parabolic reflector can collect reflected solar energy from the primary concentrating reflector by means of the secondary compound parabolic reflector; and
   e) a means for rotating and supporting the linear collector along the circular arc path so as to position the secondary compound parabolic reflector within the second focal collection zone throughout a defined solar cycle, said positioning means being connected to the collector support means.

2. The solar energy concentrating system of claim 1 wherein the positioning means is controlled by a microprocessor which periodically calculates an optimal position within the second focal collection zone for the secondary compound parabolic reflector to receive the reflected solar energy from the primary concentrating reflector.

3. The solar energy concentrating system of claim 1 comprising two primary concentrating reflectors, wherein a first primary concentrating reflector is adjacent along the entire second end edge to the second end edge of a second primary concentrating reflector, each primary concentrating reflector having a cylindrically arcuate configuration of up to about 110 degrees.

4. The solar energy concentrating system of claim 1 wherein the collector support means includes at least two collector support members, each being disposed at either end of the collector.

* * * * *